United States Patent

[11] 3,571,686

[72] Inventor Hubert B. Henegar
 Detroit, Mich.
[21] Appl. No. 643,197
[22] Filed June 2, 1967
[45] Patented Mar. 23, 1971
[73] Assignee The Bendix Corporation

[54] NUMERICALLY CONTROLLED PATH SYSTEM WITH ON-OFF SERVO
 12 Claims, 6 Drawing Figs.
[52] U.S. Cl. .................................................. 318/624,
 318/608, 318/672
[51] Int. Cl. ........................................................ G05b 5/01
[50] Field of Search............................................318/20.441,
 20.290, 20.515, 20.810, 20.810.5, 20.810.6,
 20.370

[56] References Cited
 UNITED STATES PATENTS
 3,167,697 1/1965 Anderson.....................318/(20.810X)
 3,175,138 3/1965 Kilroy et al. .................318/(20.370X)
 3,182,240 5/1965 Schmid........................318/(20.810.5X)
 3,239,736 3/1966 Gardberg.....................318/(20.810.5X)
 2,995,694 8/1961 Sorkin et al.................318/(20.441UX)
 3,229,270 1/1966 Rosenblatt ..................318/(20.441UX)
 3,356,921 12/1967 Bradford et al............318/(20.515UX)
 3,358,200 12/1967 Clifford......................318/(20.290UX)

3,412,298 11/1968 Rosener...................318/(20.515UX)

*Primary Examiner*—T. E. Lynch
*Attorneys*—Allen M. Krass, James L. O'Brien and Plante, Arens, Hartz and O'Brien ABSTRACT: A converter is disclosed for operating on the proportional control signal output of a contouring-type numerical control system to make it suitable for use with an on-off servo of the type employed with tracer-controlled machines. The converter accepts the square wave outputs of the command counter of the numerical control system, the output of the feedback resolver rotor (the stator being energized by the output of the reference counter) and a voltage proportional to the rate of motion of the controlled machine member. When the first zero crossing occurs of the command or feedback wave a time delay is initiated which is proportional to the speed of the output member by adding the voltage proportional to the member speed to a ramp voltage initiated at the crossover of the appropriate wave, and detecting the zero crossing point of the sum. If the crossover point of the second input square wave occurs during the delay period no control signal is provided to the output servo. Therefore, a dead zone proportioned in width to the speed of the output member is created. If the square wave signal crossing occurs after the time delay an output signal to the servo is provided of a sign dependent upon which of the input square waves crossed zero first.

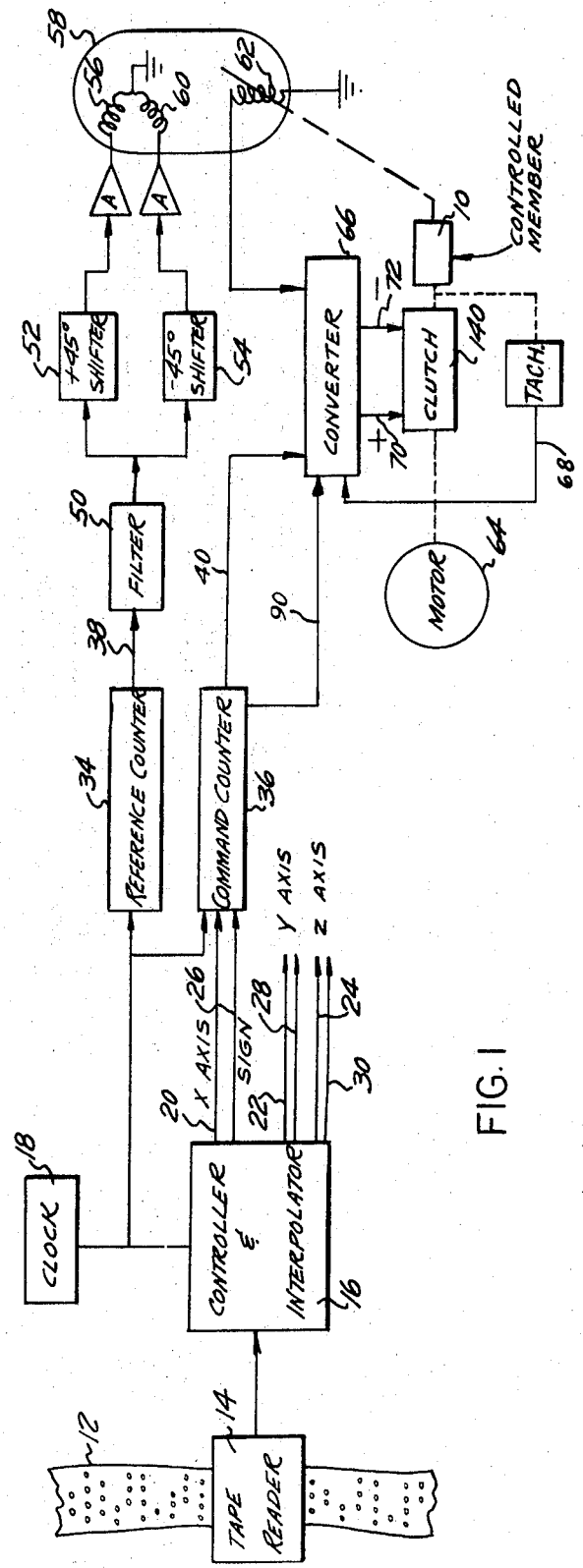
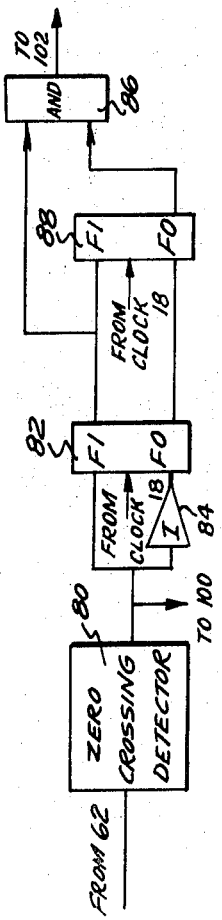
INVENTOR
HUBERT B. HENEGAR

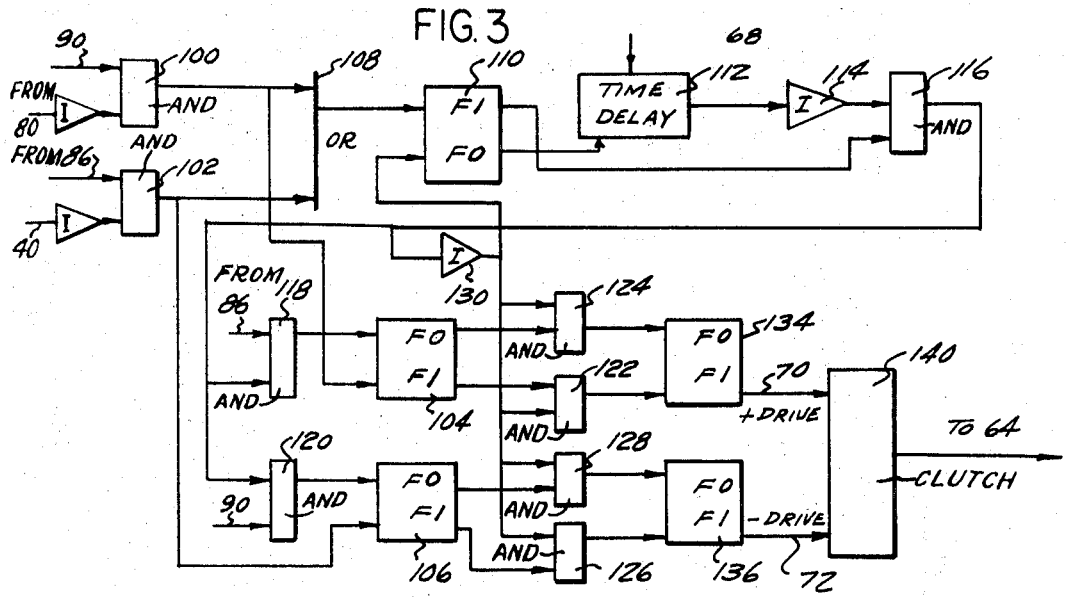
FIG. 3
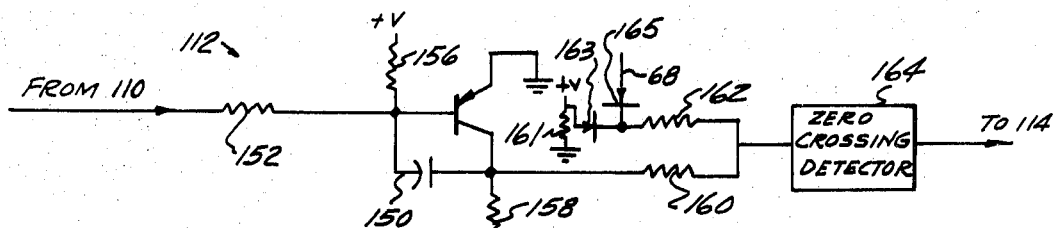
FIG. 4
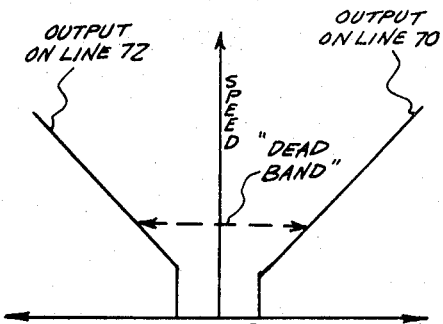
FIG. 6
FIG. 5
INVENTOR
HUBERT B. HENEGAR
ATTORNEYS

NUMERICALLY CONTROLLED PATH SYSTEM WITH ON-OFF SERVO

BACKGROUND OF THE INVENTION

1. Field Of The Invention

This invention relates to electronic systems for controlling the path of motion of an output member, usually a machine element, in accordance with input data numerically recorded on a record such as a tape, and more particularly to such a system which provides a pair of signals, one phase shifted with respect to the other, to encode the difference between the actual and commanded positions of the output member, and which employs an on-off servo drive rather than the proportional servo drive normally utilized with such systems.

2. Description Of the Prior Art

Electronic systems for controlling the motion of a machine element through a continuous path in accordance with numerically encoded input data are extensively used to automatically control milling machines and the like. Such systems have heretofore employed output servos of the proportional type which move the output member at a rate proportional to the difference between its actual position and commanded instantaneous position as generated internally by the electronic control from input numerical data defining the path. Another class of controls for milling machines utilize templates or actual workpieces as sources of input information and pass a stylus, mechanically connected to the machine cutter, over the surfaces of these templates to provide a control signal to the machine servo when its position with respect to the stylus exceeds predetermined limits. Such machines often employ an on-off servo rather than a proportional one and a "dead zone" is provided wherein no control signal is sent to the output servo from the stylus because the stylus is within an acceptable position range with respect to the model. In a certain class of tracer control systems this dead zone may be switched between two widths, allowing a roughing cut at a high speed and a lower speed finishing cut.

SUMMARY OF THE INVENTION

The present invention contemplates a modification of a numerical control system of the type described which will allow it to be used with a machine equipped with an on-off servo. Numerical control systems thus modified are well suited for use in retrofitting existing machines equipped with tracer control systems. A tracer control system may either be replaced by the numerical control system or both may be installed to feed the servo and used alternatively.

In the following detailed description of a preferred embodiment of the invention the numerical control system described is of a type which provides a phase-analogue output taking the form of a reference square wave and a command square wave which is of the same nominal frequency as the reference but which is phase-shifted with respect to the reference by a distance proportional to the desired position of the output member at any instant as commanded by the control system. The reference square wave is provided to the stator winding of a resolver which has a shaft mechanically connected to the machine member being positioned. The output of the resolver is therefore shifted to a position proportional to the actual position of the output member. In previous numerical control systems, the output resolver and the command square wave have been compared to derive an error signal proportional to the difference between the command and the actual position which is used to drive a proportional servo coupled to the output member.

The phase displacement of the command square wave with respect to the square wave derived from the output of the resolver is limited in normal operation of the system to some distance equal to less than half of the reference square wave length. In the preferred embodiment of the invention two sets of pulses are provided representing crossover points, in one direction, of the command square wave and the resolver output signal. If the command square wave crossover point in a given half-cycle leads the resolver square wave, the error in the output member is in one direction and if the resolver crossover point leads the command square wave crossover point the error is in the other direction. Accordingly, when the first crossover point occurs one of two flip-flops is set. A time delay period is also then initiated which is proportional in length to the speed of the controlled machine member. This is done by adding a positive voltage proportional to the speed of the member to a negatively increasing ramp voltage which is initiated at the occurrence of the first crossover. The zero crossing point of the sum of these voltages is used to terminate the time delay. If the second wave crosses zero in the chosen direction during the time delay period the previously set flip-flop is reset and no control signal is provided to the on-off servo during that period. However, if the second wave crosses in the chosen direction after the termination of the time delay a gate conditioned by that crossover signal and the first flip-flop is employed to set a second flip-flop which generates a control signal to the servo in the proper direction. This control signal continues until the termination of the next initiated time delay. By this system the numerical control provides a single valued control signal to the servo, in the proper direction, with a dead band between the positive and negative control signals which has a width proportional to the speed of the output member. This exactly duplicates the signal provided by the tracer control.

Various objects, applications and advantages of the present invention will be made apparent by the following detailed description of a preferred embodiment of the invention. The description makes reference to the accompanying drawings in which:

FIG. 1 is a block diagram of a numerical control system for an on-off servo representing a first embodiment of the invention;

FIG. 2 is a schematic diagram of a circuit used to generate pulses at chosen zero crossing directions of the command counter and resolver outputs;

FIG. 3 is a schematic diagram of the converter circuitry

FIG. 4 is a schematic diagram of the time delay generator employed in the converter;

FIG. 5 represents the waveforms occurring at chosen points in the system of FIG. 2 at various points in time; and FIG. 6 is a plot of the initiation of the output control signals as a function of error between the commanded and actual position, and as a function of the speed of the output member.

DESCRIPTION OF THE DRAWINGS

Referring to the drawings a preferred embodiment of the invention disclosed in FIG. 1 acts to control the motion of a member 10 which may be typically the cutter of a three axis milling machine. The path through which the member 10 is to be controlled and the instantaneous rate of motion desired for the member are recorded in numerical form on a control tape 12. A tape reader 14 creates electrical representations of successive sections of the coded information and provides these representations to a controller and interpolator 16.

The detailed configuration of the controller and interpolator 16, as well as that of other of the units which normally form numerically controlled contouring systems, may be of the type disclosed in U.S. Pat. No. 3,204,132. The interpolator 16 acts under the control of the clock 18 which is also connected to all of the other active circuitry of the system, although only a few of the more important connections are shown, to provide a plurality of output pulse trains, one for the control of each axis, in the preferred embodiment the milling machine is to be controlled along three mutually perpendicular axes and streams of pulses are provided to the X axis on line 20, the Y axis on line 22 and the Z axis on line 24. The "-Command" pulses provided on these lines represent basic increments of motion of the output member along the respective axes, for example, each pulse may represent .001 inches of movement. Since a pulse may represent motion in one of two directions, sign lines 26, 28 and 30 are paired with the respective command pulse lines. The pulses produced on the X, Y and Z axes occur at such rates with respect to one another to direct the control to move the output member 10 through paths having components along the three axes. (FIG. 1 only illustrates the control apparatus for the X axis, the control systems for the Y and Z axes being identical.)

Pulses from the clock 18 are provided to a reference counter 34 and a command counter 36. These counters constitute flip-flop chains having square wave outputs on lines 38 and 40 respectively which change state after a predetermined number of clock pulses are received. The command counter 36 differs from the reference counter 34 in that it includes means for advancing or retarding its count by one or effectively adding or subtracting a single clock pulse, for each command pulse received on line 20, depending upon the sign of that pulse as signaled on line 26. The detailed construction of the reference and command counters, which effectively convert the pulse commands on line 20 in a phase displacement of the output of the command counters, with respect to the output of the reference counter, is disclosed in U.S. Pat. No. 3,011,110.

The output of the reference counter on line 38 thus has a constant frequency and the output of the command counter on line 40 is of nominally the same frequency, but the crossing points of its square wave are phase-shifted with respect to that of the reference square wave by a distance proportional to the algebraic sum of pulses received on line 20. For example, if the last stages of the reference and command counter change state after 1,024 input pulses (as they would if they constituted a chain of ten flip-flops), each command pulse provided into the command counter 36 from line 20 will effectively shift the square wave output of the command counter on line 40 by 1/1,024 of the distance between the crossover points of the reference square wave on line 38.

The output of the reference counter on line 38 is passed through a filter 50, to convert it into a sine wave, and is then provided to a pair of phase shifters 52 and 54. The unit 52 shifts the sine wave output of the filter 50 by 45° in a first direction and provides its amplified output to one stator winding 56 of a resolver 58. The unit 54 shifts the sine wave output of the filter 50 by 45° in the opposite direction and provides its amplified output to the second stator winding 60. Thus, the stator windings 56 and 60 are provided with identical signals, derived from the reference counter 34, and then shifted with respect one another by 90°. The rotor 62 of the resolver 58 is mechanically tied into the controlled member 10 so that the position of the resolver rotor with respect to the stator produces a phase-shift into the reference signal which is proportional to the position of the controlled member.

The output of the rotor is provided to a converter unit 66 as is the square wave output of the command counter on line 40. Thus, the converter is provided with signals which are functions of the instantaneous commanded and actual positions of the controlled member 10.

The converter 66 also has a input on line 68 which provides a voltage proportional to the speed of the controlled member 10.

The function of the converter is to take these inputs and to provide output signals on lines 70 and 72 in accordance with the plot of FIG. 6. The outputs on lines 70 and 72, when they are energized, are always at the same voltage, but as the speed of the controlled member 10 increases above a predetermined level the outputs are not initiated until a relatively greater error is detected between the commanded and actual position. The output on line 70 is initiated when there is a sufficient error in the positive direction and the output on line 72 is initiated when there is a sufficient error in the negative direction. Until a certain speed is reached the tolerated error or "dead band" remains constant. As the speed of the output member increases above this point the error which will be tolerated before a control signal is provided to the output on either line 70 or 72 widens.

Turning now to a consideration of the detailed circuitry of the converter 66, the sinusoidal output signal of the resolver-rotor 62 is prepared for use by the converter by the circuitry illustrated in FIG. 2. The sinusoid is first passed through a zero crossing detector 80 of conventional construction. This circuit provides an output which changes state at the instant its sinusoidal input crosses the zero voltage axis. The output of the zero crossing detector 80 is provided to the set input of a flip-flop 82 and to the flip-flops reset input through an inverter 84. The flip-flop 82, as well as the other flip-flops described hereinafter are of the type which are conditioned by the clock pulses from clock 18 so that they change state upon the occurrence of the next clock pulse after their inputs have been properly conditioned for the change. Thus, in the clock period following the zero crossing of the sinusoid from the resolver-rotor 62, the flip-flop 82, which was previously reset, becomes set. The set output of the flip-flop 82 is provided to an AND gate 86 and to the set input of a second clock conditioned flip-flop 88. Accordingly, on the next clock pulse occurrence the flip-flop 88 will become set. The AND gate 86 is also conditioned by the reset output of the flip-flop 88. Thus, a pulse is provided at the output of the AND gate 86 in the period between the two successive clock periods wherein flip-flop 82 and the flip-flop 88 become set. This illustrated FIG. 5. This is illustrated in FIG. 5.

A similar series of pulses, which will be termed 90 (FIG. 5), are developed for one pulse period preceding the negative going change of state of the command counter output. These pulse are available from the input to the last stage of the command counter.

The position and command pulses as represented on the line from 86 and the line 90, respectively are fed to a pair of AND gates 100 and 102 (FIG. 3). The AND gate 100 is conditioned by the occurrence of a pulse on line 90, indicating a change of state of the command counter output, at such time as the resolver output 62, as represented by the output of the zero crossing detector 80, is at a positive level, rather than a negative level. Similarly, the AND gate 102 is conditioned by a pulse on the line from 86 which occurs while the output of the command counter 40 is at a positive rather than a negative level. Thus, the AND gate 100 provides an output when the command square wave crosses negatively before the reference square wave, and the AND gate 102 provides an output when the resolver output crosses negatively before the command output.

The output of the AND gate 100 is used to set a flip-flop 104 while the output of the AND gate 102 is used to set a flip-flop 106. Both outputs are also provided to an OR gate 108 so that either one sets a flip-flop 110. The output of the flip-flop 110 is provided to a time delay unit 112 which receives the signal on line 68 constituting a voltage proportional to the speed of the controlled member 10. The time delay unit 112, which will be discussed in detail in connection with the description of FIG. 4, provides an output signal at a time after the setting of flip-flop 110 which is dependent upon the speed of the output member. This signal is passed through an inverter 114 to an AND gate 116. The AND gate 116 is also conditioned by the set output of the flip-flop 110 so that it provides an output pulse having a duration equal to the time delay upon the setting of flip-flop 110.

This signal is provided to a pair of AND gates 118 and 120. The AND gate 118 is also conditioned by the output of AND gate 86 so as to provide an output if the resolver signal goes negative during the timing pulse duration. The AND gate 120 is conditioned by the command counter pulse 90 so as to provide an output if the command counter output goes negative during the timing pulse duration.

The AND gate 228 acts to reset the flip-flop 104 while the AND gate 120 output acts to reset the flip-flop 106. One of these flip-flops has been tentatively set by the outputs of the AND gates 100 and 102, respectively.

The set output of the flip-flop 104 is provided to an AND gate 122 while its reset output is provided to an AND gate 124. Similarly, the set output of the flip-flop 106 is provided to an AND gate 126 while its reset output is provided to an AND gate 128. These AND gates 122—128 all have their second conditioning input from an inverter 130 which is connected to the output of the AND gate 116. Thus, during the timing pulse from the AND gate 116 (equivalent to the time delay generated by the unit 112) the gates 122—128 provide no output. After the termination of that timing pulse they act to bring a pair of flip-flops 134 and 136 into accord with the flip-flops 104 and 106. This is done by connecting the AND gate 122 to the set side of flip-flop 134 and the AND gate 124 is connected to its reset side while the AND gate 126 is connected to its reset side while the AND gate 126 is connected to the set side of the flip-flop 136 and the aND gate 128 is connected to its reset side. The output of the set side of the flip-flop 134 constitutes a positive drive signal on line 70 while the set output of the AND gate 136 constitutes a negative drive signal on line 72. These are both provided to a clutch unit 140 which is operative to connect the constantly rotating motor to the controlled member 10 through clutches. The direction of drive of the controlled member 10 through clutches. The direction of drive of the controlled member 10 is dependent on the input signal received on lines 70 and 71.

Assume that the flip-flops 134 and 136 are initially in their reset states so that no signals are being provided to the drive unit 140. This occurs when the pulses on the line from 86 and line 90 occur at a time separation no greater than the delay being generated by the unit 112 at the instantaneous speed of the output member. This signifies that the error represented by the difference between the commanded and the actual position is within the dead zone shown on FIG. 6.

Assume that the command square wave on line 40 next changes from positive to negative. The resultant pulse on line 90 while the zero crossing detector 80 output is still positive will set the flip-flops 104 and 110 and initiate the output from the AND gate 116. If the resolver output goes negative within the time delay the AND gate 118 will cause the flip-flop 104 to be reset and, accordingly, the flip-flop 134 will remain set after the termination of the time delay output from the AND gate 116. If, on the other hand, the lag of the resolver output with respect to the command square wave is such that no signal is provided by the AND gate 118 during the time delay period, the flip-flop 104 will remain set and at the termination of the time delay will set the flip-flop 134, providing a positive output drive signal on line 70. The system will then be driven at such a direction as to bring the resolver and command square waves back into the dead zone. A similar analysis indicates the condition of the circuitry in the other modes.

The schematic diagram of the time delay unit 112 is shown in FIG. 4. Essentially it consists of a Miller integrator-type ramp generator having its output summed with the speed signal from line 68 and provided to a zero crossing detector. The signal from line 110 is provided to a capacitor 150 through a resistor 152. A grounded emitter transistor 154 has its base collector circuit shunting the capacitor. The base is provided with positive voltage by resistor 156 and the collector negative voltage through resistor 158. The output of this integrator circuit is a negatively increasing ramp voltage which starts from zero when voltage is applied from line 110. This ramp voltage is applied to a resistor 160 and is summed with a second voltage provided to a resistor 162. A positive voltage applied across a resistor 161 and added to the voltage on line 68 through a pair of diodes 163 and 165 feed resistor 162. Thus, the voltage fed to resistor 162 is never less than the base established by the positive voltage, and follows the voltage on line 68 when it exceeds that value. Accordingly, the sum starts out as a positive voltage proportional to the voltage from the line 68 (or at least the voltage across resistor 161) and begins decreasing towards zero at a constant rate. A zero crossing detector 164 receives the summed signal and provides an output at the instant the voltage crosses zero. The delay between the input signal and the output signal is, thus, proportional to the speed of the controlled member 10 when the voltage on line 68 exceeds the voltage $+V$ across the resistor 161. Therefore, it will be appreciated that the voltage $+V$ establishes the minimum delay and hence the minimum "dead band" at low speeds.

I claim:

1. In an electronic system for controlling the motion of an output member in accordance with numerical input data: a bidirectional on-off drive for the output member; a source of numerical data relating to a predetermined commanded path of the output member; means for generating an electrical representation of the instantaneous commanded position of the output member; means for creating an electrical representation of the instantaneous actual position of the output member in either direction; means for creating an electrical representation of the speed of the output member; and means for accepting all of said electrical representations and for providing a signal to said drive operative to cause said drive to move in either direction only at such time as the electrical representation of the commanded position exceeds the representation of the actual position in its corresponding direction by a predetermined quantity, said predetermined quantity varying as a function of the electrical representation of the speed of the output member, whereby a dead zone which varies as a function of the speed of the output member is provided.

2. The system of claim 1, wherein the electrical representations of both the commanded and actual positions of the output member represent cyclical signals having relative phases proportional to their relative magnitudes.

3. The system of claim 2, wherein the electrical representation of the speed of the output member is converted into a time signal having a period proportional to the speed of the output member and a signal is provided to the drive when the time interval between a change in the levels of the magnitudes representing the commanded and actual positions of the output member exceeds the time period representing the speed of the output member.

4. The system of claim 2, wherein the electrical representation of the speed of the output member constitutes a time delay and is compared to the time between corresponding points on the two electrical representations of the commanded and actual position and a signal is sent to the drive when the time represented by the phase-shift between the actual and commanded position representations exceeds the time representation of the speed of the output member.

5. The system of claim 1, wherein the numerical data is utilized to generate a plurality of trains of pulses, one for each axis of control to be exercised over the output member, one command counter is provided for each train of pulses, operative to receive the train of pulses and generate a square wave phase-shifted with respect to a reference square wave by an amount proportional to the algebraic sum of the pulses received, and a resolver having its rotor connected to the output member is energized by one of said square waves, and the outputs of the resolver and the other square wave constitute the electrical representations of the actual and commanded position of the output member.

6. The system of claim 5, wherein a time delay proportional to the representation of the speed of the output member is initiated at the zero crossing of either the output of the resolver or the other square wave and if the zero crossing of the other of said resolver output signal or the other square wave does not occur before the termination of such time delay, an energizing signal is provided to the output member drive.

7. The system of claim 6, wherein the energizing signal provided to the output member drive is of one sign if the resolver output signal crosses zero before the other square wave, and of the opposite sign if the reverse is the case.

8. The system of claim 7, wherein the first of the resolver output or other square wave to cross zero initiates a time delay and sets one of two flip-flops, depending upon which crosses first, and if the other does not cross by the termination of the time delay such set flip-flop causes the output member drive to be energized in a particular direction.

9. The system of claim 1, wherein the electrical representation of the speed of the output member is converted to a time delay signal generated by providing a voltage of a first polarity proportional to the speed of the output member and summing it with a ramp voltage, originating at a particular voltage level and increasing in an opposite direction to the polarity of the voltage proportional to the speed of the output member, and providing such sum to a zero crossing detector, whereby an output signal from the zero crossing detector is provided at a time following the initiation of the ramp which is proportional to the speed of the output member.

10. An electronic system for controlling the motion of an output member, through a on-off drive system, in accordance with input numerical data from a record, wherein a train of command pulses is generated for each axis of control of the output member, such command pulse trains are each used to phase-shift the output of a command counter with respect to a reference counter, and either the output of the command counter counter, the reference counter is used to energize a resolver connected to the output member; means for utilizing the output of the resolver and the output of either the command counter or reference counter which is not used to energize the resolver to generate an on-off output having either positive or negative sign, and having a dead zone proportional to the speed of the output member, comprising means for initiating a time delay proportional to the speed of the output member at a characteristic time of the first of said last two signals; and means for providing an energizing output to the motor drive system if the other of the last two signals does not reach a characteristic time prior to the termination of said time delay.

11. The system of claim 10, wherein said characteristic times are the zero crossing times of said two signals and wherein the first of the last two signals to cross zero sets a flip-flop, said flip-flop is reset if the other of said two signals crosses zero during the time delay period, and a second flip-flop is set by said first flip-flop if the first flip-flop is set at the end of the time delay.

12. The system of claim 11, wherein one of two flip-flops is set by the first of said last two signals to cross zero, depending upon which signal crosses zero first, and a second pair of flip-flops are connected to the respective output members of said first pair, and are set if either of the first pair are set at the end of the time delay period, said second pair of flip-flops each providing an output of one polarity to said driving motor system.